United States Patent
Korenev et al.

(10) Patent No.: US 9,791,768 B2
(45) Date of Patent: Oct. 17, 2017

(54) PROJECTION SCREEN

(71) Applicant: 3D-TEK LLC, Moscow (RU)

(72) Inventors: Denis V. Korenev, Kherson (UA); Alexander S. Gaidarov, Razvilka Township (RU)

(*) Notice: Subject to any disclaimer, the term of this patent is extended or adjusted under 35 U.S.C. 154(b) by 0 days.

(21) Appl. No.: 15/523,362

(22) PCT Filed: Jul. 17, 2014

(86) PCT No.: PCT/RU2014/000536
§ 371 (c)(1),
(2) Date: Apr. 28, 2017

(87) PCT Pub. No.: WO2015/009207
PCT Pub. Date: Jan. 22, 2015

(65) Prior Publication Data
US 2017/0255094 A1 Sep. 7, 2017

(30) Foreign Application Priority Data

Jul. 19, 2013 (RU) ................................ 2013133736

(51) Int. Cl.
*G03B 21/606* (2014.01)
*G02B 1/11* (2015.01)
*G03B 21/602* (2014.01)
*G02B 5/00* (2006.01)
*G03B 21/625* (2014.01)
*H04N 13/04* (2006.01)

(52) U.S. Cl.
CPC .............. *G03B 21/606* (2013.01); *G02B 1/11* (2013.01); *G02B 5/003* (2013.01); *G03B 21/602* (2013.01); *G03B 21/625* (2013.01); *H04N 13/0459* (2013.01)

(58) Field of Classification Search
CPC ...... G03B 21/58; G03B 21/60; G03B 21/606; G03B 21/602; G03B 21/625; G02B 5/003
USPC .................................................. 359/443–461
See application file for complete search history.

(56) References Cited

U.S. PATENT DOCUMENTS

| 6,986,581 | B2* | 1/2006 | Sun | G03B 21/60 353/31 |
| 7,213,923 | B2* | 5/2007 | Liu | G03B 21/56 353/31 |
| 2010/0141877 | A1* | 6/2010 | Huang | B29D 11/00634 349/106 |

(Continued)

*Primary Examiner* — Christopher Mahoney
(74) *Attorney, Agent, or Firm* — Patentagar PLLC; Alexander Rabinovich

(57) ABSTRACT

A projection screen for forming an image by converting light pixel pulses from a digital projector comprises a three-dimensional sheet matrix made of a transparent composite. Functional inclusions for light-scattering, light-absorbing and luminescence of the light from the projector are distributed through the matrix thickness to thereby enable that the conversion of the light pulses into the image for direct perception by eyesight be performed throughout the volume of the matrix. The matrix thickness between the frontal and rear surfaces of the matrix is selected for digital image sources between an inter-pixel grid width and tenfold diagonal size of a pixel of a digitized image on the screen. The object of the invention is to reproduce identifying features of informational models of real objects in a wide angle of image perception under side lighting.

19 Claims, 2 Drawing Sheets

(56) References Cited

U.S. PATENT DOCUMENTS

| | | | | |
|---|---|---|---|---|
| 2013/0176725 A1* | 7/2013 | Hajjar | ........................ | F21V 9/10 362/231 |
| 2013/0301122 A1* | 11/2013 | Petersen | .............. | G03B 21/604 359/452 |
| 2016/0062181 A1* | 3/2016 | Cok | ........................ | G02B 5/201 264/447 |

* cited by examiner

PROJECTION SCREEN

BACKGROUND OF THE INVENTION

Field of the Invention

This invention relates to the design of screens for digital projection technology. More specifically, it relates to the face optical part of the projection screens, which is a front part for the audience and forms a visible image therefor. This invention mainly refers to passive back-reflective direct projection screens and light-transmitting rear projection screens forming an image from light pulses of the projection light sources at the stage of their final preparation for organoleptic visual perception by end users of video information.

Description of the Related Art

A digital image projected onto the screen represents a mosaic grid of pixels illuminated by a sequence of light pixel pulses of the image light source. Each aggregate frame pixel light pulse, discrete by area and time, reproduces the averaged and then digitized brightness of the main components of chroma level (red, green and blue, or RGB). The time sequence of pixels at a given screen position changes stepwise the brightness of backlight pulses of each of the primary color components of each image pixel, at least at a frame rate, for the direct end organoleptic perception by the audience.

The existing designs of retro-reflective and light-transmitting screens of rolled, suspended and rigid subtypes have a number of disadvantages significantly limiting the functionality of their application. The main disadvantages of the existing screens and systems based thereon will include the following.

1. Ambient light by external light sources, which reduces the contrast of the perceived image which dramatically decreases the distinctiveness of gray scale shades and demands a significant increase in light flux from its source. Therefore, the existing screens require almost complete blackout of premises for the rendering of full photographic footage latitude, which is not always desirable and sometimes even impossible, since it not only limits the additional functional needs of the audience accompanying the demonstration (for example, at lessons, lectures, seminars, conferences, roundtables, etc.), but is also fundamentally unacceptable in some cases for basic security reasons when working with young children and elderly persons with disabilities.

2. The visibility of image flickering associated with a time discrete sequence of the projection of film frames and their components. Pulse technogenic image frames illumination results not only in a loss of a part of the light flux from the projector, but also dramatically increases the load on eyesight, since there are no real sources of images of such a pulsed reflection nature of natural daylight, especially at a significant pulse ratio, such as in the light valve division of stereo pair frames in a 3D projection, where even the duration of light pulses of individual image frames becomes less than the time intervals between these pulses.

With the advent of electronic digital projection, which practically superseded the analog technology from all spheres of its application, new disadvantages were added to the existing ones in the analog technology:

- the above-mentioned artificially created geometric piecewise linear extrapolation of analog images by imparting a single relatively representative discrete-bit value to the color and brightness parameters within the boundaries of each digitized image pixel in each image frame was added to the time frame-accurate piecewise linear extrapolation;
- the stationary maximum contrast inter-pixel grid of the illuminated pixel borders, which is actually a systematic hindrance of the perception of useful information, such as additional graphic pseudo-information, which was not in the originally registered events and which represents artificial sharp differences (transient processes) of information signal parameters important for perception in the same coordinates of space and periods of useful information flow, artificially and regularly divided by this receiving matrix grid into separate surrogate shares not correlating with the identification marks of the registered objects;
- additional time sampling, pulse intensification and increased duty ratio of the receipt of color frame pixel lighting pulses, especially reinforced during the sequential transmission of color components in one-matrix projectors, even more reinforced in the projectors with slow reaction of the matrices (liquid crystal LCD principle and its modifications) compared to a micromirror DLP, and even more complicated at the projection of 3D images in a system with sequential transmission of stereo frames for viewing same in light valve glasses alternately opening the view for each eye in synchronization with the destination of each frame of each story-relevant synchronous stereo pairs of the projector images.

These well-known disadvantages lead to an inadequate and uncomfortable viewing, to a dramatic increase in load and fatigue of visual organs and the whole organoleptic perception of the audience, to the lack of efficiency of the projection systems in the conditions of moderate lighting in most practical cases of multimedia applications in the actually existing demonstration premises of virtually universal purpose and life support: at lessons in schools and at seminars and lectures at universities, at conferences, in studio apartments, in cafes, bars and restaurants, at discos and ballrooms, in sport and fitness centers, in conference rooms with remote access to materials and interlocutors, in situational and dispatch control centers, in medical and judicial institutions, in imitating simulators and gaming systems, as well as in a vast variety of other similar multimedia applications.

Aside from that, the existing projectors with even standardized HD quality formats do not allow perceiving the images in a wide angle of a natural view, to which the whole evolution of motion picture industry was coming gradually and deliberately pursuing its goal of the maximum involvement of a viewer in the events of demonstrated stories through the creation of virtual <<presence effect>>. The consequence of these ambitions was the stepwise change of projection formats in the analog cinema projection from the classic width to height 4:3 screen ratio to the widescreen 16:9 and then to the wide-format 2.35:1 view and to an even more modern "I-MAX" format standing for "image maximum", referring to the solid angle maximality of possible perception of the entire image by each viewer at each moment of its demonstration. This development of formats and the accompanying change in the hall configuration from the longitudinal projection onto the short end wall to the transverse projection onto the longest longitudinal wall of the hall pursued its goal of a radical expansion of the solid angle of the image perception by viewers up to optimal values corresponding to the boundaries of natural perception (from 70 to 120-140 degrees horizontally) with the appropriate integration of peripheral vision most responsible for the perception of information images, volume and relative movements of visual objects throughout the whole field for at least the single-point eyesight, which includes its peripheral areas as well (Measurement Protocols for Medium-Field Distance Perception in Large-Screen Immersive Displays. http://www.cse.msstate.edu/~swan/publications/papers/ 2009_Klein-etal_Distance-Percep-Large-Screen_IEEE-VR- .pdf). However, the modern technology of electronic projection, even of the high-definition formats (HD) developed and standardized in view of the psycho-physiological thresholds of body-angle acuity of human vision, is reasonably recommended by the manufacturers for comfortable viewing distances not less than twice the width of the screen, which provides the value of image perception angle only about 30 degrees in the horizontal plane.

A number of inventions, e.g. RU 2078362, RU 2102786, RU 2324211, WO1998/045753, WO2004/0131853, is dedicated to the battle with some of these disadvantages.

The patent RU 2078362 describes the material for projection screens containing layers of fluorescent particles and mirror lenses distributed over the screen area. This solution helps struggle with the pulse nature of projection exposure using the interpolation redistribution of the screen illumination during the intervals between pulses. However, the spectral specificity of the afterglow of the phosphors specified in this invention makes it impossible to use this screen and its luminescent materials for adequate demonstration of the footage, and that's why such screens are intended only for devices creating original, background, and special lighting effects.

In the patent RU 2102786, refractive optical fiber layers located in the matrix plane to enhance the viewing angle, including in the ambient illumination conditions, are used in the screen matrix; at the same time, the arrangement direction of fibers in a layer is proposed to be made mainly perpendicular to the arrangement of fibers in the next layer. This technical solution does not account for the pixel structure of modern digital image formats and pursues the only goal of reducing the impact of ambient illumination, without dealing with the issues of optical interpolation both in its geometric and time schemes.

The design in the patent RU 2324211 is closest to the present invention. The patent uses a layer of focusing lenses over a layer of apertures positioned along the optical axis of each of the focusing layer lenses. As explained by the authors, the efficiency of this device is due to the fact that the projector light impinging the screen at low angles is focused by the lenses substantially more than the light of external sources, and thus reaches the light reflecting layer through the aperture openings. Among disadvantages of this known solution is its high structural and technological complexity and, accordingly, high price, as well as the regularity of the raster structure, an increment of which is fundamentally impossible to make much smaller compared to the pixel size on the screen, since the reduction of the size of optical cells in this case down to the commensuration with the wave length of incident light in air will cause a change of the laws of particle-beam optics to a fundamentally different concept of wave optics. Additionally, the comparability of the sizes of optical cells with pixel sizes causes diffraction effects in the Fraunhofer zone: regular raster structure beating with geometric periodicity of the digitized signals from the projectors.

Moreover, the strategic disadvantage of the approach used in the design disclosed in the patent RU 2324211 is the idea of the authors about the provision of high resolution for digital video systems by increasing the playback clarity of artificially added technogenic features of digital images, such as computer graphics and animation, texts, charts and other video products of the computer display origin and handling, which have no direct relation to reality registered with the use of sampling by analogy with the "Procrustean bed" method known since ancient times, rather than by recreating the informative details of the reproduced images as identification marks of the visual images of real objects in the dynamics of its movements. These technogenic information objects of computer graphics initially form within the boundaries of rectangular pixel grids of the mosaic image structure at a uniform color-brightness filling within the boundaries of each pixel and with an additional pulse time fragmentation of frame and color image component parts. They are initially technogenic, have no natural originals and detailed inner pixel structure, and therefore they cannot require an interpolation recovery of any intermediate values of the parameters during playback as it is required by the compressed digital samples of the filming of real objects implemented with the forced limited angular and temporal resolution within the used digitization standard and the used playback technology, but nevertheless intended to adequately present to the organoleptic perception the original analog realities having a priori an indefinitely high angular and time resolution.

Optical anisotropic structural elements in the form of optical fibers were used to improve the quality of the images obtained from optical screens for direct projection under external illumination conditions, as indicated in the U.S. Pat. No. 7,116,873, U.S. Pat. No. 6,741,779, U.S. Pat. No. 6,535,674 and in the International application WO2008/ 0285125. However, these known devices were aimed only at increasing the image contrast under external illumination conditions. Fundamentally unrepairable defects of the specified structures are their high technical and technological complexity inevitably resulting in the rise in the cost of products. Moreover, the geometrical regularity (periodicity, determinacy) of the optical heterogeneity of the working surface of such video interfaces inevitably contributes to the manifestations of interference with another geometric periodicity—a pixel grid of the projector light flux brightness, thereby resulting in the appearance of additional geometric patterns in the form of alternating lines, blotchiness and "feathers" with various chrominance and brightness due to the effect of beating of two or more periodic processes. These interference patterns, as well as the artifacts of image digitization mentioned above, are basically absent in the initial information. Their occurrence is also caused just by the imperfection of the technical means used for registration, compression, storage, processing, transmission and playback of the images. The common disadvantage of all these known devices is the absence of full consideration of perceptual psycho-physiological characteristics of the perception subjects of typical visual images and individual identification marks, inherent in the images of real footage objects, by the visual organs.

The main objective of the interpolation recovery of intermediate signal values deliberately discarded in the digitization process at the expense of the forced saving of scarce technical resources is a recreation of perceptually significant identification marks of information signals, which is implemented only until the visibility limits of the imported technogenic elements of pixelated images have been reached. Data compression in digital-to-analog recording devices is carried out through extrapolation sampling of conditionally representative luminance values of primary colors, further used by the modern signal recording algorithms for uniform filling the entire area of each pixel in this frame time interval. Such an algorithm of the initial compression of an information flow is typical for all systems of signal registration, which essentially are all the known formats of analog-to-digital signal conversions and codecs (both lossless and with information losses), being the devices of further compression of information signals at the expense of the discarding of conditionally insignificant and a priori recoverable parts of these signals. Mostly used to restore the intermediate values of video signals lost during sampling in the intellectual systems of image improvement and other devices of sample decoding up to progressive scan and scaler devices is an intellectual computer software for signal pre-processing employing the following two abilities of eyesight:

1) interpolating averaging of per-frame and intra-frame pulse values of chrominance components and signal luminance;

2) aprioristic pre-expectation of movements anticipating the likely changes in the boundary positions of characteristic identification marks and features of an observed real object at its natural movements and turns with respect to its surroundings in view of perspective distortions of scale, color saturation and atmospheric haze.

However, computer interpolating restoration of signal detail is a very effective means of restoring its informational content, if only the projection equipment has a many-fold higher pixel and frame resolution than the one inherent in the material being played. The possibilities of a significant image quality enhancement at the expense of a many-fold increase in the number of pixels virtually exhausted its potential with the appearance and introduction of cameras, codecs, monitors and projectors with high-definition formats (HD). Additionally, the strategy itself for reducing the visibility of the image digital nature by reducing the size of their discrete elements solves the problems by means of technology intensification and pursues only an indirect goal, not paying enough attention to the ultimate goal of the restoration of the original analog nature of the filmed originals of the displayed objects.

The existing projection systems, consisting of a light flow source (projector) and a projection screen, did not pay due attention until recently to a possible reduction of the visibility of digital structure of the images of real recognition objects directly on the screen, including the dynamics of movements of these objects. This lack of attention to the optical interpolation was encouraged also by the lack of reliable detailed data on the criteria for pixel image structure visibility in cinema projection, which left the developers of projection and screen technology only with the criteria of static thresholds of perceptible image difference for eyesight in photography (Measurement Protocols for Medium-Field Distance Perception in Large-Screen Immersive Displays. http://www.cse.msstate.edu/~swan/publications/papers/ 2009_Klein-etal_Distance-Percep-Large-Screen_IEEE-VR.pdf).

A similar problem of interpolation restoration of image brightness intermediate values in a geometric plan was studied in radiological medical devices—CT scanners, on the information completeness therefrom the health and lives of patients depend, see U.S. Pat. Nos. 4,680,709 and 5,058,011. However, these devices produce an interpolation and holographic restoration of initially unknown specific details of the patient's anatomical anomalies presented in the form of analog information between sequential discrete value readouts of stationary object image settings at the defined changes of angular direction of the probing beam, and do that only due to the special software, without assigning a tasks of interpolation restoration of the pre-expected intermediate signal values in real time of incoming converted signals describing the moving objects.

SUMMARY OF THE INVENTION

This invention is directed to achieving the necessary minimum functional consumer qualities in projection screens and displays in most cases of their multimedia and specific functional application, the main object being providing movie watching ergonomics at a wide angle of instantaneous image perception by each viewer, and the additional objects being:

1) providing comfort when viewing modern 3D surround image formats, among others; and 2) increasing the perceived contrast of images to ensure the implementation of photographic width of the footage at playback under moderate side illumination of the screen by external light sources.

The above-mentioned main and additional objects are achieved in the present invention by providing a projection screen for forming an image by converting light pixel pulses from a digital projector, the screen including a three-dimensional sheet matrix made of a transparent composite, the matrix being defined by a front and a rear surfaces thereof, wherein functional inclusions for light-scattering, light-absorbing and luminescence of the light from the projector are distributed through the matrix thickness to thereby enable the conversion of the light pulses into the image for direct perception by eyesight to be performed throughout the volume of the matrix, the matrix thickness between the frontal and rear surfaces being for digital image sources selected between an inter-pixel grid width and tenfold diagonal size of a pixel of a digitized image on the screen.

In case of direct projection of images with reflection of projector light flow, a rear side of the screen has a light-reflecting coating with a reflection coefficient of 0.1 to 0.999, and a value of roughness on the reflecting surface is not more than ¼ of the violet light wavelength in the transparent matrix material. The light-reflecting coating can be mirror-matt, and its back side can have an opaque coating absorbing the light emission that passed through the mirror coating.

The outer surfaces of the composite matrix transformative layer can have an anti-reflective coating.

The front or both outer surfaces of the composite matrix can be satined with microlens, raster, prism or multi-spike structures having random distribution of sizes and/or directions of the structure extended in the surface plane and having a typical size of roughness cross sections of no more than ¼ of the violet light wavelength in the transparent matrix material.

A fine-dispersed light-scattering component in the form of aerogel, micro-spherules, micro-crystallites, powder and similar components or mixtures thereof of oxides of titanium, calcium carbonates or other white pigments with a typical size of not more than ⅕ of the width of gaps between discrete image elements at the screen can be introduced into the volume of the matrix uniformly across the screen, and a total amount of these composite components in the matrix is selected so that they would cumulatively overlap at least 15% of the image area.

Furthermore, a microdispersed luminescent additive having a typical time of afterglow from 0.02 to 0.3 seconds is introduced into the matrix, and a total amount of this additive is selected based on the organoleptic criterion of image flicker invisibility at a projector projection frame rate.

A microdispersed mixture of luminescent additives characterized by a predominantly resonance luminescence and by a frequency selectivity with luminescent return maxima can be introduced into the matrix, wherein said maxima correspond to the standardized transmission frequency maxima of a color separation system of the projector in use.

In order to provide contrast and playback of black color, a fine-dispersed light-absorbing component in the form of fibers, powder, needle- or sphere-shaped nanostructures (buckyballs and/or fullerenes) is introduced into the matrix, wherein a total amount of this component per area of light flow overlapping is determined by the condition of preserving at least one third of a total useful light flow from the used projector.

The light-absorbing component may be made of carbon fiber, including carbon fiber having nano-sized cross sections, wherein the fiber length is from 0.05 to 1.0 from the matrix layer thickness, and the ratio of the fiber length to its thickness is at least 10, wherein the fibers are oriented along emission beams and across the matrix, and a typical distance between the fibers is from 0.01 to 1.5 of distances between the discrete elements of the projector image on the screen.

The matrix may be made of high-molecular polymeric materials in which polymer macromolecules are predominantly oriented along the course of light beams of the projector in use.

Also, the projection screen according to this invention may have a cylindrical or an ellipsoidal shape, with radii in the horizontal and vertical cross-section planes from the minimum viewing distance to infinity.

The front surface of the screen may be covered with light-absorbing fibers oriented perpendicularly to the plane of the screen surface.

The light-absorbing fibers may be oriented predominantly along the course of projector light beams in case of a rear projection screen or along the median of the courses of projector direct and inverse beams in case of a retroreflective screen of front projection.

The functional irregularities may be distributed across the matrix thickness layer-wise and/or with a continuously varying concentration within the layer or throughout the whole matrix thickness.

Moreover, the projection screen of this invention may be provided with a light valve layer of controlled light flow transmittance, as well as with a system for automatic adjustment of light transmission depending on brightness of an external illumination.

BRIEF DESCRIPTION OF THE DRAWINGS

The above features and advantages of the present invention will now be discussed in more detail with the use of the accompanying drawings, in which.

DETAILED DESCRIPTION OF THE INVENTION

Figure 1:
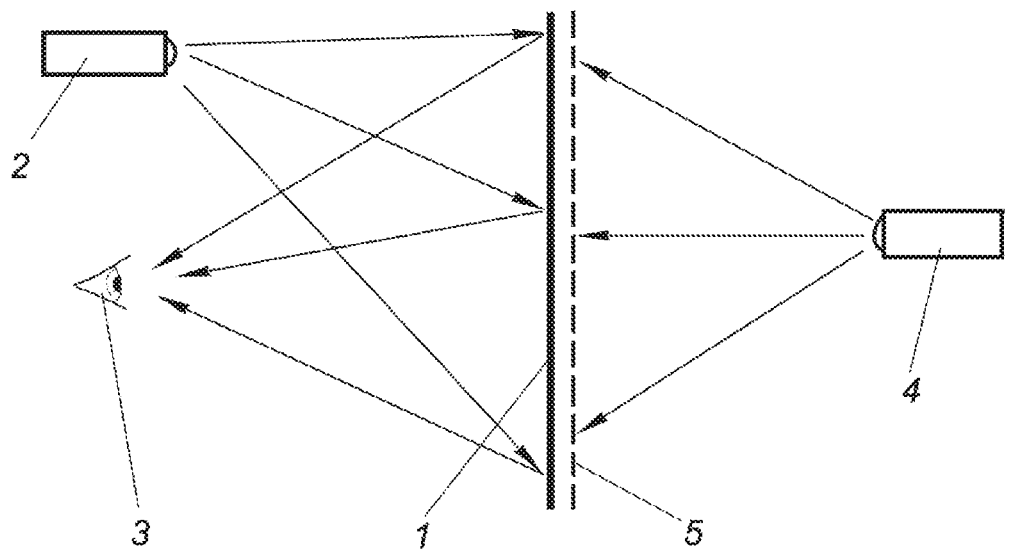
FIG. 1 shows a schematic side view of a projection system and a viewing area for front and rear projection using the projection screen according to the present invention.

A projection screen 1 according to this invention may be used both for front projection (in a retroreflective screen) when a projector 4 is installed on the same side of the screen as the eyes 3 of viewers, and for rear projection (in a light-transmitting screen) when a projector 4 and the eyes 3 of viewers are located on different sides of the screen (FIG. 1). If a light-emitting panel 5 is used as the image source, then the screen 1 acts as a lining on this panel.

Figure 2:
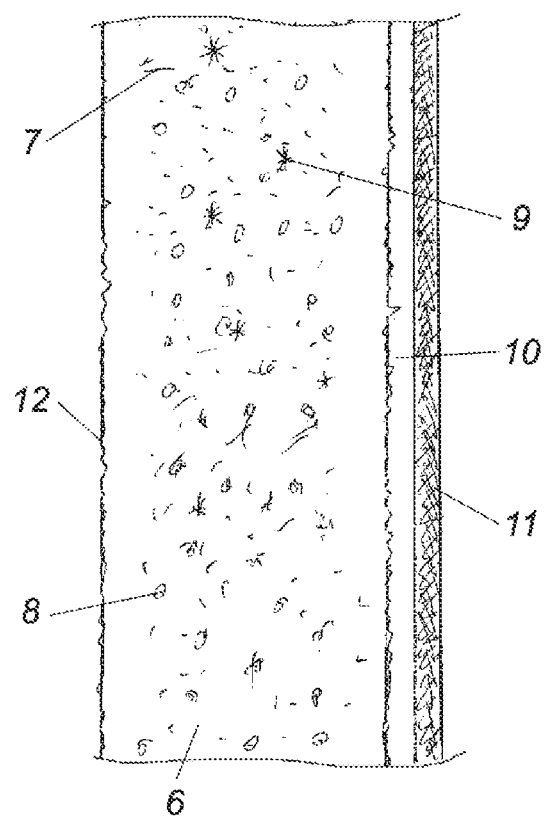
FIG. 2 shows a schematic sectional view of the projection screen composite matrix according to this invention, with a continuous distribution of functional irregularities within the matrix thickness.

The screen 1 includes a matrix 6 made of composite material (FIG. 2), across the layer thickness of which the functional irregularities (inclusions) are distributed in the form of light-absorbing particles 7, light-scattering particles 8, and luminescent particles 9. A light-reflective coating 10, the back side of which has an opaque coating 11, is applied to the back side of the matrix 6.

Figure 3:
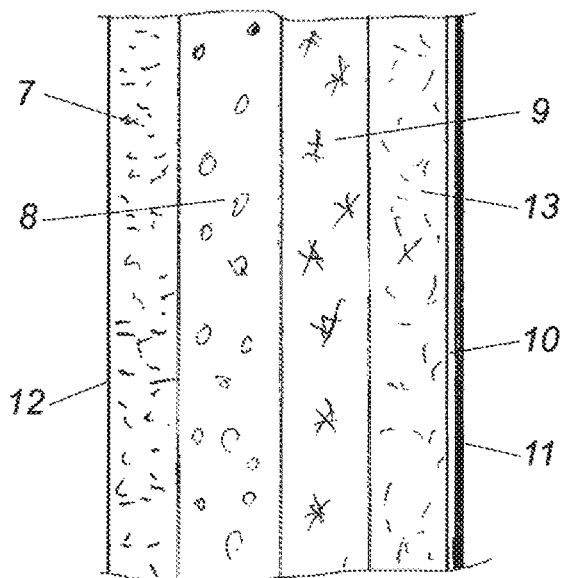
FIG. 3 shows a schematic sectional view of the projection screen composite matrix according to this invention, with the layer-wise distribution of functional irregularities.

The particles 7, 8 and 9 may be distributed across the thickness of the matrix 6 with a continuously varying concentration over the entire matrix thickness (FIG. 2) or layer-wise (FIG. 3). The concentration of particles 7, 8 and 9 in the layer may be either constant or variable across the thickness of the respective layer at layer-wise distribution.

The FIG. 3 option shows the matrix 6 containing a layer of preferential anisotropic absorption with the light-absorbing particles 7, a layer of preferential scattering with the light-scattering particles 8, a layer of preferential luminescence with the luminescent particles 9 and a layer 13 of inhomogeneous refraction, the layers being sequentially located thickness-wise in the direction from a front surface 12 of the matrix to the opaque coating 11 thereof.

Figure 4:
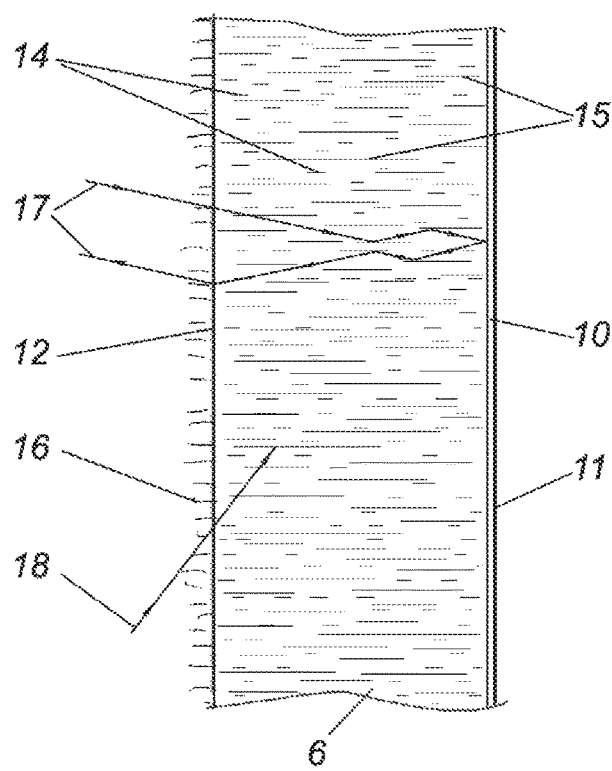
FIG. 4 shows a schematic sectional view of the projection screen composite matrix according to this invention, into which the directional light-absorbing fibers are introduced, showing a scheme of light beam passage from the projector and external sources through the matrix.

The FIG. 4 option shows polymer macromolecules 14 of the matrix oriented along its thickness, wherein a light-absorbing component of carbon fibers 15 oriented along the matrix thickness is introduced into the matrix. The matrix front surface 12 is covered with light-absorbing fibers 16 oriented perpendicularly to the screen surface plane. The projector light beams 17 pass through the matrix thickness with the macromolecules 14 and the light-absorbing fibers 16 and return to the viewer, and side illumination beams 18 are mainly absorbed at the lateral surfaces of the fibers 15 and 16.

The working layer of the projection screen according to this invention is designed as a three-dimensional volumetric sheet matrix that covers the entire area of the screen working surface. The matrix sheet thickness is within the range from the width of inter-elemental (inter-pixel) interval up to the tenfold value of the characteristic dimensions of image discrete element (pixel diagonals) of the projector on this screen. At least the front matrix surface (turned to the audience) is made antiglare and/or has a coating with anti-reflective properties to eliminate glimpses, glares and reflection of objects on the screen surface. The matrix itself is made of a relatively form-stable composite of a transparent material, in the volume of which the particles of functional inclusions are uniformly distributed over the screen area and mainly heterogeneously across the matrix thickness. The relative stability of the form provides for the possibility of manufacturing the matrix from an elastic material ensuring the preservation of its thickness and surface smoothness. Such a design of the functional part of the screen allows to distribute the functional inclusions across the composite matrix thickness providing the anisotropy of its optical properties and thus the high efficiency of interaction between the useful projector light beams with the screen and the dosing of time-dependent inter-pulse and space and geometrical inter-pixel interpolation, but at the same time providing the blocking and preferential absorption of the sided illumination beams. The back side of the retro-reflective screen matrix has a light-reflecting coating. The particles of functional irregularities (inclusions) of the matrix composite make it possible: a) the preferential absorption of sided illumination, b) preferential scattering, c) induced resonant luminescent re-emission of projector light with the dosed interpolation of the light of neighboring pixels and pulses of their illumination, both by their location geometry and by the time of their appearance. The functional screen properties depend on the angle of light incidence on its surface. The functional composite screen matrix microparticles may be distributed layer-wise in the matrix across its thickness, or continuously, or in combination with layered and continuous distribution with variable concentration and/or optical density to optimize the interpolation and discriminatory screen properties under external illumination conditions.

Particles with a maximum achievable minimal albedo (black dyes of natural or synthetic origin, coal, graphite or carbon dust, soot, ink, carbon fullerenes, buckyballs, carbon fibers and threads, nanotubes, staple segments of optical fibers with carbon coating or cladding and other similar spherically and axially symmetrical micro- and nano-sized particles, including the ones with the developed microfiber surface, may be used as the light-absorbing particles. To successfully protect images against external illumination, the optical density maximum of the light-absorbing particles should be located in an area not further from the front screen surface than the concentration maximum of light scattering particles is located in the matrix. In order to increase the efficiency of the interpolation screen properties and the discrimination of useful (intelligence) projector light from external illumination due to the additional optical anisotropy of the composite screen matrix, it is most expedient to use light-absorbing microparticles with an extended shape, the length of which should be considerably greater than their lateral dimension. In order to make the lateral dimensions provide the diffraction in the Fresnel approximation, and to make the fiber length provide the diffraction in the Fraunhofer approximation, the cross-sectional dimensions of these particles is rational to select from among the light-absorbing material nano-sized modifications, for example, segments of carbon fibers, carbon nanotubes, staple segments of optical fibers with carbon cladding of nano-sized thickness, and the likes thereof. The length of fiber segments of light-absorbing inclusions in the matrix composite should be manifold greater than the light wavelength in the matrix material in the red limit of visible light frequency band. For the maximum image contrast in external illumination conditions, those nanofibers or nanotubes should be oriented in the matrix composite along the normal to the layer surface, or, which is more efficient, mainly along the median of the light beam path from the projector through the matrix and further into the viewing area.

Mainly micro-sized particles of white pigments with a high albedo value (titanium, zinc and calcium oxides, as well as ground chalk, marble, mother-of-pearl, etc.), glass and polymer microspheres, hollow micro-spherules, etc. may be used as the light-scattering particles to provide high screen luminous efficiency. The concentration of light-scattering particles in the matrix composite should have a maximum in the zone located near the matrix rear side, so that the projector light beams passing into the matrix and from it at low angles to the normal at the minimum trajectory, practically determined by the screen matrix thickness, be respectively subjected to minimum absorption along this path, even at the centrally symmetric shape of the light-absorbing particles. Whereas the light beams of the external illumination fall onto the screen surface at significantly greater angles to the normal and thus are forced to go over much longer distances being exposed to a much greater absorption, respectively. The ratio of light transmission for the useful projector light to the light transmission for an external screen illumination may be even more enhanced by orienting the light-absorbing particles with an extended shape along the normal to the screen surface, and intensified even more by orienting the light absorber fibers in accordance with the path of screen beams. Specifically, orienting the light-absorbing fibers along the median of the path of falling and returning projector beams is the best for reflective screens of direct projection. In so doing, design features of an interpolation screen may prove dependent on the subtype of the projector optics (short-focus or long-focus), but the long-focus optics in retro-reflective interpolation screens does not allow to implement a wide viewing angle, since the viewer in this case will be unwittingly forced to block off the projector beam with his/her body. This problem does not occur in the case of the most common off-axis direct projection with the short-focus optics, and screens of specific sizes for the projectors with standard resolution may have a unified structure.

Materials with a time constant of afterglow in the visible spectrum from 0.05 to 0.25 seconds may be used for the time interpolation directed against the visibility of pulsed image flickers as luminescent particles and/or additives and coatings for light-scattering particles, whereas quantum dots, quantum wires or boxes with spectra of luminescence induced re-emission of mainly resonance type, which spectra correspond to the spectral windows of transparency of color separation systems of projectors, may be used for a greater effect of the selectivity response to the useful projector light. The concentration of luminescent particles may be uniform across the layer thickness of the composite screen matrix, and may have a local minimum near the front surface of the composite screen matrix where there is anisotropy across the matrix thickness.

To reduce glare from external light sources, the front surface of the screen matrix should be made micro- or nano-grooved, for example, satined with a prismatic shape of surface grooves of micro sizes along the length and of nano sizes over the depth with random orientation. According to the second satin option, the matrix surface may represent an aggregation of micro lenses covering the entire matrix surface. According to the third option, the anti-glare satin surface represents a collection of micro spikes obtained due to the etching of the matrix material or the substrate, on which the matrix sheet has been molded. Microcavities in the matrix in this case may be filled with transparent material with a different refraction index value.

A mirror coating is applied to the back side of the screen matrix to return the light flow in the retro-reflective screens of direct projection. The mirror texture should be mainly matt from the back side of the retro-reflective screen matrix to reduce the "hot spot" effect when the projector lamp light strikes the viewers' eyes directly.

The anisotropy of the optical properties of the layered composite and the degree of projector beam dispersion at the selected surface density of the concentration of light-absorbing fibers or polymer-molecular structures with anisotropic refraction are determined by the ratio of the diameter of the fibers to their length and the ratio of their length to the average distance between the fibers. The specific optical density of such a composite layer for the beams falling along the fibers will practically not depend on the thickness of the layer and will be proportional to the specific sum of the fiber cross-sections per screen area unit ($n \cdot \pi r^2$), where n is the specific fiber density per a screen surface area unit, and r is the fiber radius. Whereas the specific optical density of the layer per an area unit and a penetration depth unit for the beams falling at the screen surface at an acute angle will be, ceteris paribus, proportional to the specific total area of longitudinal dimensional fiber cross-sections ($n \cdot 2 \; r \cdot L \cdot \cos \phi$), where L is the fiber length, and $\phi$ is the incidence angle of the external illumination light beam.

The ratio of specific optical densities of such an optical system for the beams of the external light and projector per beam path length unit will be—$2 \; L \cdot \cos \phi / \pi r$, i.e. about $\frac{2}{3} \cdot (L/r)$. Thus, the ratio of specific optical densities will amount to approximately 120 at a ratio of fiber length to its diameter no less than 100.

Also, this estimate does not take into account the multiple difference between path lengths passed through by useful and external beams in the sheet base of the interpolation screen to the exit therefrom in the direction of perception.

The estimated dosing of smooth overlapping of light flows of neighboring pixels in the geometrical plan is based on the average value of the scattering angle of the projector light passing between the absorbing fibers to the light reflecting and scattering screen particles. This angle $\psi$ is determined by the formula $tg\psi = \Delta/L$, where $\Delta$ is the average distance between fibers. Assuming approximately that the value of pixel spot overlapping should be around 15% of their length, then the angular pixel size will be 0.06° and the overlapping angle will be 0.004° for the Full HD format at a viewing distance equal to half the width of the screen. Hence, it follows that the average distance between fibers should be approximately 15% of their length, and the average surface density $\rho$ of the oriented fiber with the length L should be approximately $\rho \approx 1/\Delta^2$, which, for fibers 1 mm long, will be approximately 50 fibers per square millimeter if spaced approximately at 150 micrometers from each other. With the fiber diameter of about 10 micrometers, the total specific optical density of fiber end surfaces for the useful projector light will be approximately 0.4% of the screen surface, and the specific optical density of this structure for external light beams will reach about 50%.

INDUSTRIAL APPLICABILITY

The industrial applicability of this invention is illustrated by the following examples.

Example 1

At its most basic case, the screen matrix with a width of the working surface from 2 to 3 meters designed for using a projector with the resolution from HD-ready up to Full HD is formed as a flat sheet of mineral, synthetic or organic glass, which is transparent or tinted on the surface or over the volume in a neutral gray color. The sheet thickness may range from 0.2 to 8 mm. The front surface of the sheet has anti-reflective processing, for example, in the form of satin finish. The back side of the sheet is covered with a layer of clear lacquer with microparticles of light-absorbing substance, soot- or aniline dye-based, and re-emitting luminescence substance made of milled mother-of-pearl. The characteristic dimensions of these functional particles should be between 5 and 25 microns for effective light scattering. The relative area of covering the rear matrix surface by the light-absorbing particles is not more than 50% of this surface. A matt mirror coating layer of from aluminum powder in a transparent mineral or organic binder or metallization of the satin finish is located behind the absorption and re-emission layer in retro-reflective screens, and an opaque layer of black paint or film opaque to light, for example, the "Orakal"® type or similar, is located behind this layer.

Example 2

An interpolation screen with a composite matrix made of organic glass. Applied to the back side of the interpolation screen which has a total sheet width of 2-5 mm, the matrix of the sheet being made of a commercially available satined translucent block organic glass tinted to a neutral gray color with a transmission factor more than 50% for light-transmitting rear projection screen and more than 25% for retro-reflective direct projection screen, and with the inclusion of luminescent particles into the matrix volume, is a directional absorption layer with a thickness from 0.1 mm to 2 mm from a transparent binder with light-absorbing carbon fibers or carbon nanotubes distributed therein with a ratio of fiber staple characteristic length to their diameter not less than 100 and with a fiber density of $(2-7) \; D/(P \cdot L \cdot d)$ per unit area of the screen matrix working surface; and mostly oriented, at the application, along the thickness of the matrix or along the median between directions (forward and back, in case of a direct projection screen) of the projector beam propagation into the viewing area at a given matrix point, where:

D is the layer thickness with fibers;
d is the fiber diameter;
L is the fiber staple length,
P is the pixel diagonal size of the projector in use on the screen.

A layer with light-scattering particles is applied behind the above-described layer of directional absorption, a matt mirror coating being applied behind the directional absorption layer in direct projection retro-reflective screens, a continuous light-absorbing coating, similar to the one in the Example 1, being applied behind the matt mirror coating.

Example 3

Interpolation screen with a composite matrix, similar to that in the Example 2, but with functional particles, which are included directly in the matrix material and distributed therein layer-wise and/or continuously.

Example 4

Interpolation screen with a composite matrix, where the concentration of light-absorbing fibers across the matrix thickness has local maxima near front and rear sides, and the concentration of light scattering and luminescent functional particles reaches a maximum not closer than the area of maximum concentration of light-absorbing fibers located in the proximity of the rear side of the matrix.

A projection screen, at its most basic case of its implementation according to Example 1, operates as follows. The incident light of each color component of the projector color separation system at each individual pixel of this projection frame falls onto the antiglare matrix surface, thus breaking into a multitude of partial beams forming a new wave front due to the mutual interference in accordance with the Huygens principle, and then passes through the matrix thickness to its back surface of the interface with the next layer, deviating towards the normal to the screen surface according to the Sinnelius law. When falling on the luminescent re-emission material particles in the next layer directly and/or reflected from the mirror back surface in the retro-reflective screens, the light of the source undergoes a resonance-induced and spontaneous re-emission, with preferred maximums in the transmission bands of filters of the projector color separation system. Being absorbed in the luminophores, this radiation excites the metastable levels of luminophore molecules, whereby the response to the pulse excitation re-emitted by them is delayed by the characteristic time constant of the metastable levels, which was selected approximately equal to the period of frame repetition in a 2D projection and a 3D projection with a polarization division of stereoscopic image for each eye or to half of that time in a 3D projection with a light valve time division—quite similar to the time interpolation widely used in cathode-ray picture tubes (CRT) of television equipment.

Scattering of the re-emitted projector light at the light diffusing matrix composite microparticles is also based on the Huygens principle. As this takes place, a radiation front moving mainly in the direction of the screen front side is formed from a plurality of point micro-sources of the re-emission. This provides the smoothing of pulse fluctuations of frame image components in time and selective spectral re-emission of image source light simultaneously with a predominant absorption of external source light, which falls on the matrix under much larger angles to the normal and misses the spectrum bands of the luminescent particle re-emission. Thus obtained re-emission of each image pixel in each frame in reflective screen passes back through the matrix towards the side of viewing and becomes visible in a smoothly expanded area overlapping the inter-pixel borders with neighboring pixels and covering from 10% up to half of the minimum size of neighboring pixels, thus interpolatively smoothing the color-brightness digital geometric features of the sampled images in addition to the aforementioned time interpolation due to the inter-frame delay of luminescent re-emission.

An additional separation of predominantly saved useful projector light and predominantly absorbed light of the side illumination occurs in a more complex design according to Examples 2, 3 and 4. The optical anisotropy of the matrix due to the use of light-absorbing particles in the form of fibers predominantly oriented along the screen matrix thickness according to Example 2, or (which is more optimal) in the direction of a median between the projector beam incidence angle and the direction to viewing area according to Examples 3 and 4 during the screen operation leads to the fact that a useful source light incident on the screen at a small angle to the normal and/or to the direction of light-absorbing fiber orientation or optical fiber coating orientation predominantly diffracts at the fibers, being only slightly absorbed by the end portion of their surfaces, and propagates through the matrix experiencing the total internal reflection at the boundaries of the matrix transparent material with the fibers having a different refractive index. The estimated concentration of the fiber distribution density in the matrix at a selected ratio of the fiber length to their diameter is used here as a regulator of the geometric interpolation value, limiting the divergence of re-emitted light in the matrix within the aforementioned limits. On the contrary, the light of external illumination sources incident at large angles to the surface is, firstly, refracted in the matrix less intensively without causing glare by the reflected flow part due to the refraction at micro-inhomogeneities of the fiber edges on the frontal matrix surface additional to the satin finishing of its surface or other anti-reflective coatings or treatments; and, secondly, the side illumination light entering the matrix at large angles has to travel much greater distances in the matrix before exiting therefrom than twice the matrix thickness, while meeting, as this takes place, the side fiber surfaces at small angles to the normal to their length and therefore experiencing a preferential absorption. Enhancing this effect of projector light discrimination from side illumination is further contributed to by:

a) nanoscale diameter of light-absorbing fibers, and
b) predominant orientation of linear macromolecules of the matrix polymeric material along the thickness of its layer according to Example 2 and, even more efficient, their orientation in the direction of a median between the directions of refracted falling projector beams in the volume of the layer of this screen matrix area and returning light beams before their refraction on the front surface of the matrix interface for further propagation in the direction of the viewing area according to Example 3, which are additional to the orientation of light absorbing fibers.

The abovementioned examples of screen applications are not representing all the options of using this invention, the scope of which is defined by the claims.

Besides the main purpose of these screens for digital projection systems, they may be successfully used in all existing systems of analog and digital-analog projection giving a greater depth and naturalness of information to the projected images and movies.

Moreover, such screens may be used as the most representative monitors for video editing of the film footage and as overlays for screens and monitors for computer animation and graphics, thus improving ergonomics and reducing the eye strain for operators during continuous operation.

The invention claimed is:

1. A projection screen for forming an image by converting light pixel pulses from a digital projector, the screen including a three-dimensional sheet matrix made of a transparent composite, the matrix being defined by a frontal and a rear surfaces thereof, wherein functional inclusions for light-scattering, light-absorbing and luminescence of the light from the projector are distributed through the matrix thickness to thereby enable the conversion of the light pulses into the image for direct perception by eyesight to be performed throughout the volume of the matrix, the matrix thickness between the frontal and rear surfaces being for digital image sources selected between an inter-pixel grid width and tenfold diagonal size of a pixel of a digitized image on the screen.

2. The projection screen according to claim 1, wherein, in case of direct projection of images with reflection of projector light flow, a rear side of the screen has a light-reflecting coating with a reflection coefficient of 0.1 to 0.999, and a value of roughness on the reflecting surface is no more than ¼ of the violet light wavelength in the transparent matrix material.

3. The projection screen according to claim 2, wherein the light-reflecting coating is mirror-matt.

4. The projection screen according to claim 3, wherein a back side of the light-reflecting coating has an opaque coating absorbing the light emission that passed through the mirror-matt coating.

5. The projection screen according to claim 1, wherein the outer surfaces of the composite matrix have an anti-reflective coating.

6. The projection screen according to claim 1, wherein the frontal or frontal and rear outer surfaces of the matrix are satined with microlens, raster, prism or multi-spike structures having random distribution of sizes and/or directions of the structures extended in the surface plane and having a typical size of roughness cross-sections of no more than ¼ of the violet light wavelength in the transparent matrix material.

7. The projection screen according to claim 1, wherein a fine-dispersed light-scattering component in the form of aerogel, micro-spherules, micro-crystallites, powder and similar components or mixtures thereof of oxides of titanium, calcium carbonates or other white pigments with a typical size of not more than ⅕ of the width of gaps between discrete image elements at the screen is introduced into the volume of the matrix uniformly across the screen, and a total amount of these composite components in the matrix is selected so that they would cumulatively overlap at least 15% of the image area.

8. The projection screen according to claim 1, wherein a microdispersed luminescent additive having a typical time of afterglow from 0.02 to 0.3 seconds is introduced into the matrix, and a total amount of this additive is selected based on organoleptic criterion of image flicker invisibility at a projector projection frame rate.

9. The projection screen according to claim 8, wherein the microdispersed luminescent additive includes more than one luminescent additives characterized by a predominantly resonance luminescence and by a frequency selectivity with luminescent return maxima, wherein said maxima correspond to the standardized transmission frequency maxima of a color separation system of the projector.

10. The projection screen according to claim 1, wherein a fine-dispersed light-absorbing component in the form of fibers, powder, needle- or sphere-shaped nanostructures is introduced into the matrix to provide contrast and playback of black color, the total amount of said component per area of light flow overlapping being determined by the condition of preserving at least one third of a total useful light flow from the projector.

11. The projection screen according to claim 10, wherein the light-absorbing component is made of carbon fiber, including carbon fiber having nano-sized cross sections, wherein the fiber length is from 0.05 to 1.0 of the matrix thickness, and the ratio of the fiber length to its thickness is at least 10, the fibers being oriented along emission beams and across the matrix, and a typical distance between the fibers being from 0.01 to 1.5 of distances between the discrete elements of the projector image on the screen.

12. The projection screen according to claim 1, wherein the matrix is made of high-molecular polymeric materials in which polymer macromolecules are predominantly oriented along the course of light beams of the projector.

13. The projection screen according to claim 1, wherein the screen has a cylindrical or ellipsoidal shape, with radii in the horizontal and vertical cross-section planes being from the minimum viewing distance to infinity.

14. The projection screen according to claim 1, wherein the front surface of the screen is covered with light-absorbing fibers oriented perpendicularly to the plane of the screen surface.

15. The projection screen according to claim 1, wherein the frontal surface of the screen is covered with light-absorbing fibers oriented predominantly along the course of projector light beams in case of a rear projection screen or along the median of the courses of projector direct and inverse beams in case of a retroreflective screen of front projection.

16. The projection screen according to claim 1, wherein the functional irregularities are distributed across the matrix thickness layer-wise and/or with a continuously varying concentration within the layer or throughout the whole matrix thickness.

17. The projection screen according to claim 1, wherein the screen is provided with a light valve layer of controlled light flow transmittance.

18. The projection screen according to claim 1, wherein the screen is provided with a system for automatic adjustment of light transmission depending on brightness of an external illumination.

19. The projection screen according to claim 1, wherein an optical density maximum of the light-absorbing inclusions is located in an area not further from the front screen surface than a concentration maximum of light scattering inclusions is located in the matrix.

* * * * *